United States Patent [19]

Turiot

[11] 4,433,820

[45] Feb. 28, 1984

[54] AIRCRAFT UNDERCARRIAGE

[75] Inventor: André Turiot, Morsang S/Orge, France

[73] Assignee: Messier-Hispano-Bugatti (S.A.), Montrouge, France

[21] Appl. No.: 401,278

[22] Filed: Jul. 23, 1982

[30] Foreign Application Priority Data

Aug. 12, 1981 [FR] France .................................. 81 15586

[51] Int. Cl.³ ............................................. B64C 25/10
[52] U.S. Cl. ................................................. 244/102 R
[58] Field of Search ......... 244/100 R, 102 R, 102 SS, 244/102 SL; 74/469, 519-521

[56] References Cited

U.S. PATENT DOCUMENTS

| | | | |
|---|---|---|---|
| 2,362,016 | 11/1944 | McKinnie | 244/102 R |
| 2,750,134 | 6/1956 | Hawkins, Jr. et al. | 244/102 R |
| 2,960,287 | 11/1960 | Barlow | 244/102 R |
| 2,974,909 | 3/1961 | Perdue | 244/102 R |
| 3,488,020 | 1/1970 | Scherer | 244/102 R |
| 4,312,485 | 1/1982 | Masclef et al. | 244/102 R |

*Primary Examiner*—Galen L. Barefoot
*Attorney, Agent, or Firm*—Sughrue, Mion, Zinn, MacPeak & Seas

[57] ABSTRACT

The undercarriage comprises: a leg (1) pivotally mounted about a first pivot axis (14) which is fixed relative to a rigid structure of the aircraft; a main sidebrace (30) comprising at least two articulated levers (31 and 32) having first ends pivotally connected to each other about a fourth pivot axis (33), having respective other ends pivotally mounted about a second pivot axis (37) which is fixed relative to the rigid structure, and pivotally mounted about a third pivot axis (36) which is fixed relative to the leg; and a drive (40 to 48) for causing the levers to pivot relative to each other. The first, second, third, and fourth pivot axes are parallel to each other.

7 Claims, 4 Drawing Figures

AIRCRAFT UNDERCARRIAGE

The present invention relates to undercarriages for aircraft, and more particularly to retractable undercarriages which are housed in wells provided for the purpose in aircraft fuselage or airfoil.

BACKGROUND OF THE INVENTION

Undercarriages are already known which essentially comprise a leg having running gear mounted at one end and means at the other end for connection to the aircraft, and in particular to the rigid structure thereof.

The running gear is generally associated with damping means for absorbing the jolts to which the running gear may be subjected during taxiing, take off, and landing.

An undercarriage also generally includes a collapsible side-brace having one end connected to the leg and its other end connected to a rigid point on said rigid structure of the aircraft.

Further, in order to retract and to extend the undercarriage, jack means or the like are generally provided both to collapse the side-brace and to raise or lower the undercarriage into or out from the wells provided in the aircraft for housing the undercarriage during flight.

Naturally there are many types of undercarriage that fall within the general description given above. Each particular undercarriage is designed to meet differing constraints, such as: the shape of the fuselage; the available anchor points for the undercarriage; the weight of the aircraft; its capacity; the kinds of use to which it will be put; etc.

The present invention is particularly concerned with providing an undercarriage that is of simplified design, but which is nonetheless capable of being fitted to airplanes and to aircraft in general in which the anchor points available for fixing the leg and the side-brace are not necessarily aligned and which may be off-set relative to a plane of symmetry through the aircraft. Such off-set anchor points cause considerable problems in undercarriage design. Up to now the available solutions have been excessively complicated and, worse, very heavy, which is always detrimental to the construction of an aircraft.

SUMMARY OF THE INVENTION

The present invention provides an undercarriage for an aircraft including a rigid structure, the undercarriage comprising: a leg pivotally mounted about a first pivot axis which is fixed relative to said rigid structure; a main side-brace comprising at least two articulated levers having first ends pivotally connected to each other about a fourth pivot axis, and having respective other ends pivotally mounted about a second pivot axis which is fixed relative to said rigid structure, and pivotally mounted about a third pivot axis which is fixed relative to said leg; drive means for causing said levers to pivot relative to each other; wherein said first, second, third, and fourth pivot axes are parallel to each other; and wherein said first ends of the levers comprise respective two-tined forks with corresponding pairs of tine ends being pivotally interconnected about said fourth pivot axis, said levers, when in an extended position, having a common center line which intersects said fourth pivot axis at a point S and at an oblique angle α, the point S being located between the tines of both forks such that relative to the point S and to the center line of the lever to which it belongs, one of said tines of each fork constitutes an acute angle side tine and the other tine constitutes an obtuse angle side tine; and said forks being so disposed relative to each other that one of said tines of each fork constitute an inside tine and the other tine constitutes an outside tine, and where the inside tine of each fork is a tine located in between the two tines of the other fork; said inside tine being said obtuse angle side tine of the fork, and said outside tine being said acute angle side tine thereof.

Preferably said end of said side-brace which is pivotally mounted about said second pivot axis is located on said rigid structure at a point which is off-set relative to a plane passing through said leg and perpendicular to said first pivot axis.

Said second pivot axis is advantageously located above a plane passing through said first pivot axis and extending parallel to a reference plane of said rigid structure.

Said drive means for causing said levers to pivot relative to each other may include an auxiliary side-brace comprising two articulated rods having first ends pivotally connected to each other about a seventh pivot axis, and having respective other ends pivotally mounted about a fifth pivot axis which is fixed relative to said rigid structure, and pivotally mounted about a sixth pivot axis which is fixed relative to one of said levers of the main side-brace, said fifth, sixth, and seventh pivot axes being parallel to each other and to said first through fourth pivot axes.

Said drive means may further include control means cooperating with said auxiliary side-brace to cause it to collapse or to hold it rigid, as required.

Said inside tines of said forks should be as far apart as possible.

Each tine of each fork is preferably in contact with a corresponding one of the tines of the other fork.

BRIEF DESCRIPTION OF THE DRAWINGS

An embodiment of the invention is described by way of example with reference to the accompnaying drawings, in which.

MORE DETAILED DESCRIPTION

Figure 1:
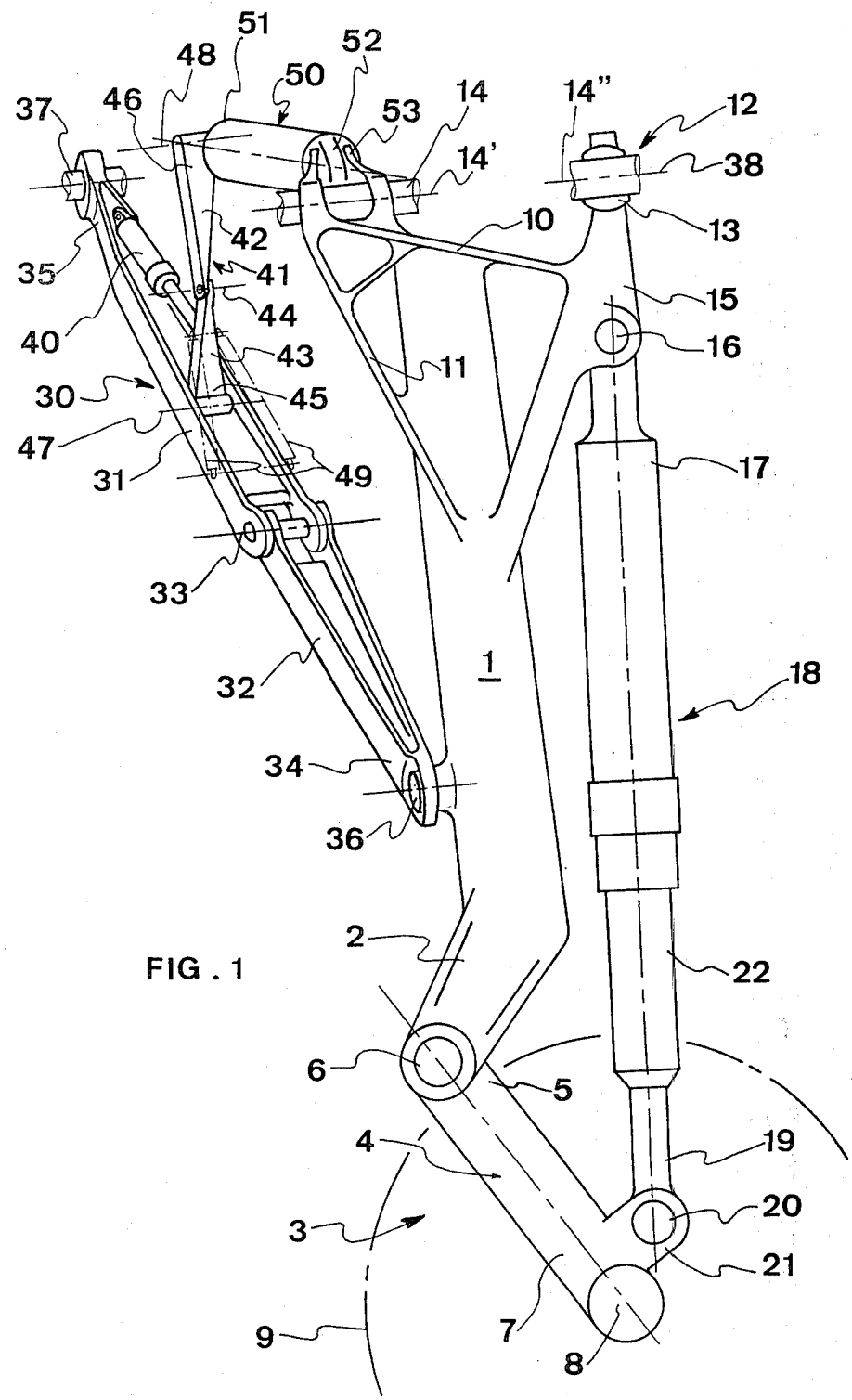
FIG. 1 is a semi perspective view of an extended aircraft undercarriage in accordance with the invention.

FIG. 1 shows an advantageous embodiment of an undercarriage in accordance with the invention. It comprises a leg 1 made from a relatively solid piece of metal and having one end 2 which co-operates with running gear 3.

The running gear may be constituted, as shown, by a wheel lever 4 having one end 5 connected to said end 2 of the leg 1 by a pivot pin 6. The other end of the lever 4 supports a wheel 9 on a stub axle 8, or a set of wheels disposed on either side of the lever 4. Other forms of running gear, eg. a bogie, could be used instead, depending on the technical requirements of the aircraft and on the kind of runways it is to use.

The other end 10 of the leg 1 is fitted with re-inforcing struts 11 and supports fastening means 12 connecting it to the rigid structure of the aircraft. The fastening means may be constituted, for example, by bearings 13 arranged to rotate about a pivot pin 14 which is fixed to the rigid structure of the aircraft. Said pivot pin 14 defines a first pivot axis 38. A pivot pin 16 is mounted on the re-inforcing struts 11 and an off-axis portion 15 of the leg 1 which is advantageously close to the end 10. The pivot pin 16 is connected to a first end of a shock absorber 18, eg. its cylinder end 17. The other end 19 of the shock absorber 18 is connected to another pivot pin 20 located on an off-axis portion 21 at the end 7 of the lever 4. In the example shown, this end 19 of the shock absorber is its piston rod 22.

As mentioned above, the undercarriage includes a collapsible side-brace 30 essentially comprising two articulated levers 31 and 32 hinged to each other about a pin 33.

The other two ends 34 and 35 of the side-brace 30 are connected respectively to a pivot pin 37 defining a second pivot axis, and made fast to the rigid structure of the aircraft, and to a pivot pin 36 defining a third pivot axis and made fast to the leg 1.

The pin 37 to which the end 35 of the side-brace 30 is connected is situated at a point which is off-center relative to the pivot pin 14 about which the leg 1 is pivotally mounted.

In other words, the three undercarriage fastening points defined by the pin 37 and the two points 14' and 14" where the pivot pin 14 engages the leg 1 constitute an obtuse angle triangle, ie. the projection of the point 37 on the first pivot axis 38 defined by the pin 14 lies outside the portion of the axis lying between the points 14' and 14".

As explained above, the side brace 30 is collapsible about the pin 33 which defines a fourth pivot axis. To collapse the side-brace, the undercarriage includes "collapsing" means, ie. means to cause the lever 32 to pivot relative to the lever 31. Said means for collapsing the side-brace 30 comprise a jack 40 co-operating with an auxiliary side-brace 41 constituted by two small articulated rods 42 and 43. One end 46 of the auxiliary side-brace is pivoted about a pin 48 made fast to the rigid structure of the aircraft and defining a fifth pivot axis, the other end 45 of the auxiliary side-brace is pivoted about a pin 47 made fast to the lever 31 of the main side brace 30 and defining a sixth pivot axis, and the middle of the auxiliary side-brace is articulated about a pin 44 defining a seventh pivot axis.

Finally the undercarriage is associated with retraction means diagrammatically represented by a jack 50 having one end 51 fixed to the rigid structure of the aircraft, and its other end 52 connected to a lever fixed to an off-axis portion 53 of the leg 1 in such a manner as to cause the leg 1 to pivot about the first pivot axis 38 under the control of the jack 50, between a retracted position and an extended position. The detail of the retraction and the extension movement is described further on with reference to FIGS. 2 and 3.

The undercarriage described above has a very great advantage in that the first through seventh pivot axes defined above are all parallel. This facilitates construction of the undercarriage since there is no need to use ball and socket type joints, simple axial bearings being useable all round. This has advantages of simplifying design and construction of the bearings, and of making them lighter, which is always an important requirement in aircraft.

When running along ground that is not perfectly smooth (whether during taxiing, take off, or landing) the undercarriage operates as follows:

When the wheel 9 encounters a raised or lowered portion of ground, it jolts sharply up or down, with the lever 4 rocking in a clockwise or a counterclockwise direction relative to the leg 1. In either case, the shock absorber is actuated by means of its piston rod 22, and the jolts are thus damped or absorbed. This phenomenon is well known, and is not described in greater detail in the present specification.

The operation of the undercarriage during retraction and extension is as follows.

Figure 3:
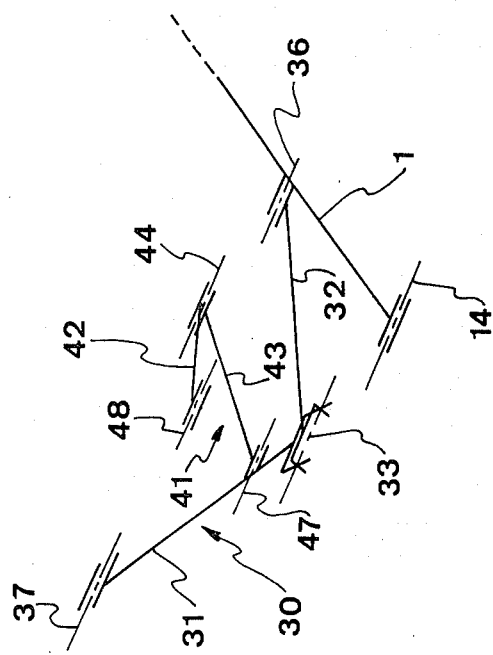
FIGS. 2 and 3 are diagrams showing the positions of the members of the undercarriage of FIG. 1 in the extended and the retracted positions respectively.
Figure 2:
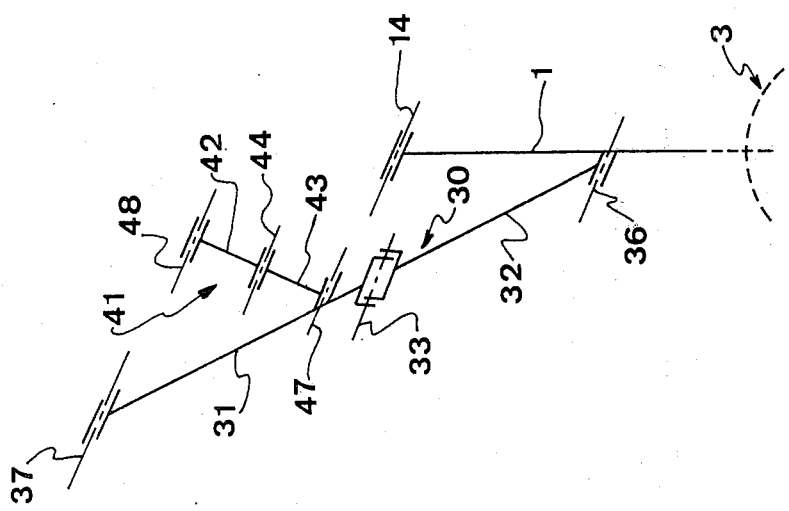

Firstly reference is made to FIGS. 2 and 3 which are center line diagrams showing the main components of the undercarriage shown in FIG. 1 in the extended and in the retracted positions respectively. The same components have the same reference numeral in all three of said figures.

FIG. 2 shows the undercarriage in its extended position, ie. its position when the aircraft is standing on the ground or running along it. In this case the side-brace 30 and the auxiliary side-brace 41 are both extended such that the levers 31 & 32 and the rods 42 & 43 are aligned in respective pairs.

When the undercarriage is to be retracted, the alignment of the rods 42 and 3 is collapsed by means of the jack 40 as shown in FIG. 1. This causes traction to be applied to the pin 47, thereby collapsing the side-brace 30 about the pin 33, causing the levers 31 and 32 to pivot relative to each other about said pin.

The collapsing side-brace 30 applies traction to the pin 36 tending to pivot the leg 1 about the pin 14. The respective lengths and deflections of said levers, and the positions of the pivot axes of the main and the auxiliary side-braces 30 and 41 are chosen in such a manner as to enable the leg 1 to take up its final position, ie. its position such that the undercarriage is retracted into the well provided therefor in the aircraft.

The main advantage of such a realisation can now be seen: since the first through seventh pivot axes are parallel, all pivoting takes place without difficulty and in parallel, such that there is no difficulty passing from the extended position of FIG. 2 to the retracted position of FIG. 3.

As mentioned above, the pins 14, 37 and 48 are in positions that are shifted relative to a perpendicular to their axes. Thus, while the main side-brace is being folded, said pin move into a plane passing substantially through the leg 1, such that the components of both side-braces, ie. the levers 31 and 32 and the rods 42 and 43 all lie in substantially the sme plane. The resulting volume to be housed in the wheel well is essentially determined by the thickness of said components folded on top of each other, and is thus reduced to a minimum. Roughly speaking, when retracted, all said components stack up in a quadrilateral defined by the positions of the pivot pins 37, 48, 14 and 36. Advantageously, and for practical retraction of the undercarriage without applying large forces to the side-braces, the pivot pin 37 is in a plane that is slightly higher than the plane containing the pivot pin 14 and the pivot pin 36 when the undercarriage is retracted (FIG. 3). The side brace 30 is thus folded but at an angle of less than 180°. This ensures that the pivot pin 37 is above the plane passing through the pin 14 perpendicularly to the leg 1 in its extended position. This plane is a reference plane in the rigid structure of the aircraft, and is generally the plane of its airfoil.

To recapitulate, the advantage of such an undercarriage is that since all its pivot axes are parallel, force is not required to ensure pivoting thereabout, and further, by virtue of the positions at which both side-braces and the leg are attached to the rigid structure, the volume occupied by the retracted undercarriage is of minimal thickness which means that much of the undercarriage can be retracted into the airfoils, ie. the aircraft wings.

Advantageously, two identical springs 49 may be provided between the lever 31 of the side-brace 30 and the rod 43 of the auxiliary side-brace 41. The springs extend on either side of said members and the ends of the springs are fixed thereto by pins parallel to said pivot axes of the main side-brace 30.

The springs 49 assist in folding both of the side-braces 30 and 41 by adding resilient force to the control force provided by the jack 40.

As mentioned above, the pivot pins 37 and 36 do not stack on top of each other as the undercarriage is retracted from the extended position. These pivot pins 37 and 36 are far enough apart from each other for the levers 31 and 32 to be at a non-zero angle to each other when the main side-brace 30 is folded. To fit in with such conditions the side-brace 30 needs to be of a special design.

Figure 4:
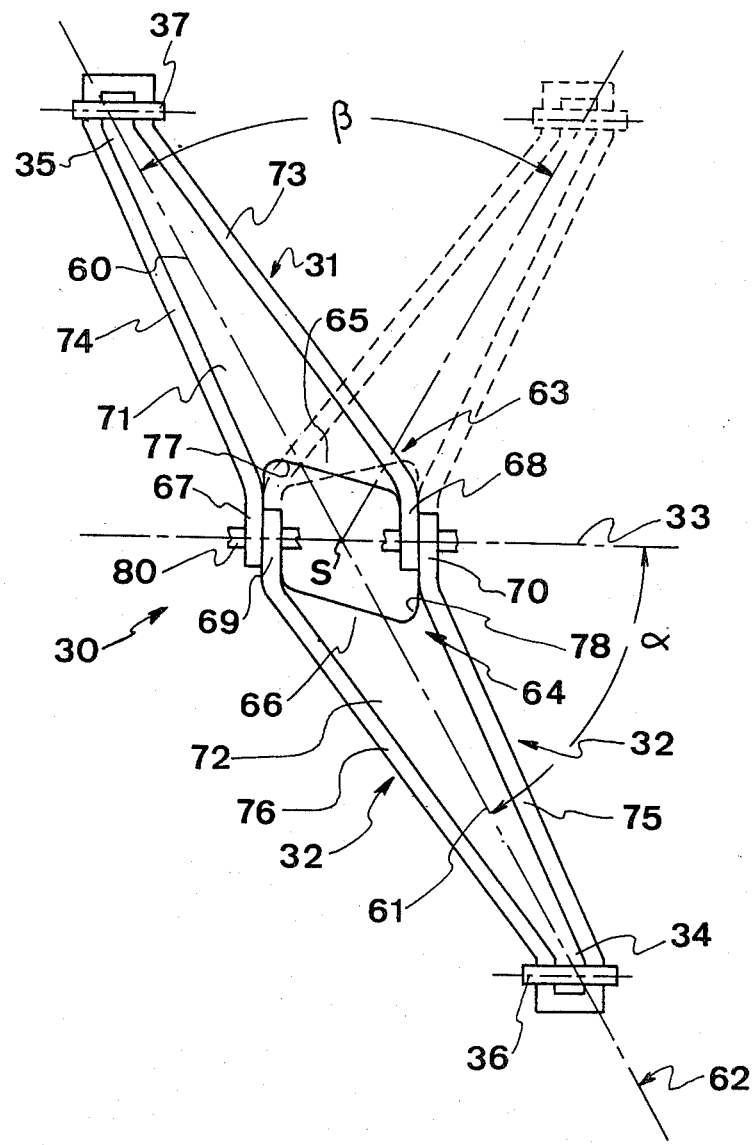
FIG. 4 is a plan view of a main side brace of said undercarriage.

FIG. 4 is a view on an enlarged scale of a preferred embodiment of the side-brace 30 in which the levers do not superpose when the side-brace is folded, but in which they occupy as nearly as possible a single plane.

When the undercarriage is extended, the two levers 31 and 32 of the side-brace 30 are substantially aligned with each other. The center lines 60 and 61 of the respective levers are exactly in line to constitute a single center line 62.

The ends 63 and 64 of the respective levers 31 and 32 where they are joined to each other, are in the form of two forks 65 and 66 respectively. The pivot pin 33 is represented by two fragments 80, each interconnecting one tine from each fork. In more detail, the fork 65 of the lever 31 comprises two tines 67 and 68 and the fork 66 of the lever 32 comprises two tines 69 and 70. The tine 69 of the fork 66 is located in between the tines 67 and 68 of the fork 65 and adjacent to the tine 67. Likewise the tine 68 of the fork 65 is located in between the tines of the other fork and adjacent to the tine 70. Thus the tines 67 and 70 are outside tines of the side-brace 30 while the tines 69 and 68 are inside tines. The inside tines 69 and 68 are located as far apart from each other as possible.

Each lever 31 and 32 of the side-brace is generally in the form of a tapering I-beam with a tapering web 71 or 72 in between pairs of flanges 73 & 74 and 75 & 76 respectively. The tines of the forks are constituted by portions of the flanges extending beyond the broader ends of the tapering webs.

As described above, the end 35 of the the lever 31 is mounted to rotate about the pivot pin 37 itself mounted on a fixed point of the rigid structure of the aircraft, while the oposite end 34 of the other lever 32 is mounted to rotate about the pivot pin 36 on the leg 1 of the undercarriage.

When the undercarriage is extended, the said fourth pivot axis, ie. the axis of the pin 33, is at an oblique angle α relative to the common center line 62, said line and said axis intersecting at a point S in between the tines of each fork.

When the undercarriage is retracted into the aircraft, the side-brace 30 folds about the pin 33 such that the lever 32 takes up a position relative to the lever 31 as shown in dashed lines in FIG. 4.

The center lines 60 and 61 of the respective levers still meet at the point S, but instead of being in line, they intersect at an angle β. This arrangement of the two levers and their connecting forks allows for minimal superpositioning of the folded levers inside the aircraft and hence they occpy minimal volume inside the aircraft.

When the levers are folded onto each other, the flanges 75 and 73 do not cross each other at all, and while the flanges 76 and 73 do cross each other, they do so at a point which is as far as possible from the pin 33 due to the side separation of the tines of each of the forks. The wide ends of the webs 71 and 72 are suitably cut out at 77 and 78 respectively to receive the ends of the inside tines 69 and 68 of the other levers when the assembly is folded. This is necessary to accommodate the disk shape of the tines which is somewhat larger than the depth of the flanges over the rest of their lengths, as can best be seen in FIG. 1. The effect of having a single crossing point between the lever flanges (and located as far as possible from the pivot pin 33) is to enable maximum folding of the brace, and consequently minimum volume for housing it inside the aircraft.

I claim:

1. An undercarriage for an aircraft including a rigid structure, the undercarriage comprising: a leg pivotally mounted about a first pivot axis which is fixed relative to said rigid structure; a main side-brace comprising at least two articulated levers having first ends pivotally connected to each other about a fourth pivot axis, and having respective other ends pivotally mounted about a second pivot axis which is fixed relative to said rigid structure, and about a third pivot axis which is fixed relative to said leg; and drive means for causing said levers to pivot relative to each other; the improvement wherein said first, second, third, and fourth pivot axes are parallel to each other; and wherein said first ends of the levers comprise respective two-tined forks with corresponding pairs of tine ends being pivotally interconnected about said fourth pivot axis, said levers, when in an extended position, having a common center line which intersects said fourth pivot axis at a point S and at an oblique angle α the point S being located between the tines of both forks such that relative to the point S and to the center line of the lever to which it belongs, one tine of each fork constitutes an acute angle side tine and the other tine constitutes an obtuse angle side tine; said forks being so disposed relative to each other that one tine of each fork constitutes an inside tine and the other an outside tine, where the inside tine of each fork is located in between the two tines of the other fork; and wherein said inside tines are said obtuse angle side tines and said outside tines are said actue angle side tines.

2. An undercarriage according to claim 1, wherein said end of said side-brace which is pivotally mounted about said second pivot axis is located on said rigid structure at a point which is off-set relative to a plane passing through said leg perpendicularly to said first pivot axis.

3. An undercarriage according to claim 1, wherein said second pivot axis is located about a plane passing through said first pivot axis and extending parallel to a reference plane of said rigid structure.

4. An undercarriage according to claim 1, wherein said drive means for causing said levers to pivot relative to each other include an auxiliary side-brace comprising two articulated rods having first ends pivotally connected to each other about a seventh pivot axis, and having respective other ends pivotally mounted about a fifth pivot axis which is fixed relative to said rigid structure, and pivotally mounted about a sixth pivot axis which is fixed relative to one of said levers of the main side-brace, and said fifth, sixth, and seventh pivot axes being parallel to each other and to said first through fourth pivot axes.

5. An undercarriage according to claim 4, wherein said drive means further includes control means operatively connected with said auxiliary side-brace to cause it to collapse or to hold it rigid, as required.

6. An undercarriage according to claim 1, wherein said inside tines of said forks are as far apart as possible.

7. An undercarriage according to claim 6, wherein each tine of each fork is in contact with a corresponding one of the tines of the other fork.

* * * * *